US00RE36487E

United States Patent [19]

Wainfan

[11] E Patent Number: Re. 36,487

[45] Reissued Date of Patent: Jan. 11, 2000

[54] AIRPLANE WITH VARIABLE-INCIDENCE WING

[75] Inventor: Barnaby Wainfan, Long Beach, Calif.

[73] Assignee: Freewing Aerial Robotics Corporation, College Park, Md.

[21] Appl. No.: 08/557,374

[22] Filed: Nov. 13, 1995

Related U.S. Patent Documents

Reissue of:

[64] Patent No.: 5,086,993
Issued: Feb. 11, 1992
Appl. No.: 07/308,655
Filed: Feb. 9, 1989

U.S. Applications:

[63] Continuation of application No. 08/195,247, Feb. 14, 1994.

[51] Int. Cl.[7] ..... B64C 03/38; B64C 03/10

[52] U.S. Cl. ..... 244/48; 244/7 B; 244/7 C; 244/34 A

[58] Field of Search ..... 244/39 R, 12.4, 244/23 B, 67, 7 A, 7 B, 7 C, 48, 34 A

[56] References Cited

U.S. PATENT DOCUMENTS

| | | | |
|---|---|---|---|
| Re. 18,181 | 9/1931 | Stelzer . | |
| 1,016,929 | 2/1912 | Black . | |
| 1,083,464 | 1/1914 | Roche . | |
| 1,132,503 | 3/1915 | Wittkowski . | |
| 1,472,103 | 10/1923 | Vandevelde . | |
| 1,771,257 | 7/1930 | Ingram . | |
| 1,772,586 | 8/1930 | Wilford . | |
| 1,844,448 | 8/1932 | Sramek . | |
| 1,845,307 | 2/1932 | Maxwell . | |
| 1,861,336 | 5/1932 | Cox . | |
| 1,875,267 | 8/1932 | Savoja . | |
| 1,892,925 | 1/1933 | Barycz | 244/48 |
| 1,906,005 | 4/1933 | Hall . | |
| 2,058,678 | 10/1936 | Fry . | |
| 2,063,030 | 12/1936 | Crouch . | |
| 2,066,649 | 1/1937 | Sabins . | |

(List continued on next page.)

FOREIGN PATENT DOCUMENTS

| | | | |
|---|---|---|---|
| 1162174 | 4/1958 | France | 244/34 R |
| 1531444 | 3/1970 | Germany | 244/34 R |
| 7209 | of 1909 | United Kingdom . | |
| 375530 | 6/1932 | United Kingdom . | |
| 732657 | 6/1955 | United Kingdom . | |

OTHER PUBLICATIONS

NASA Contractor Report 2946, "Analytical Study of a Free–Wing/Free–Trimmer Concept", Porter et al, Feb. 1978, pp. v–115.

NASA Contractor Report 3135, "Extended Analytical Study of the Free–Wing/Free–Trimmer Concept," Porter et al, 1979, pp. iii–85.

*Primary Examiner*—Virna Lissi Mojica
*Attorney, Agent, or Firm*—Lowe Hauptman Gopstein & Berner

[57] ABSTRACT

The craft is for hovering flight, vertical takeoff and landing, and horizontal forward flight. It has a tail-sitting fuselage and a ducted fan mounted to the fuselage aft to provide propulsion in both (a) hovering and vertical flight and (b) horizontal forward flight. At each side is a floating wing, supported from the fuselage for passive rotation (or an actuator-controlled optimized emulation of such rotation) about a spanwise axis, to give lift in forward flight. The fuselage attitude varies between vertical in hovering and vertical flight, and generally horizontal in forward flight. Preferably the fuselage is not articulated; there is just one fan, the sole source of propulsion, rotating about only an axis parallel to the fuselage; and thrust-vectoring control vanes operate aft of the fan. Preferably at each side a small, nonrotating wing segment is fixed to the fuselage, and the floating wing defines—along its trailing portions—a corner notch or slot near the fuselage; forward portions of the fixed wing segment are within this notch. Preferably the spanwise axis is along a surface of the floating wing, and a long hinge supports that wing from the fixed wing segment, within the notch. During vertical and transitional flight characteristically the leading edge of the floating wing is down relative to the fuselage axis.

27 Claims, 5 Drawing Sheets

U.S. PATENT DOCUMENTS

| | | | |
|---|---|---|---|
| 2,082,674 | 6/1937 | Young . | |
| 2,118,987 | 5/1938 | Smith . | |
| 2,347,230 | 4/1944 | Zuck . | |
| 2,362,224 | 11/1944 | Roseland . | |
| 2,416,958 | 3/1947 | Sears . | |
| 2,438,309 | 3/1948 | Zimmerman . | |
| 2,481,379 | 9/1949 | Zimmerman . | |
| 2,541,922 | 2/1951 | Hosford . | |
| 2,563,298 | 8/1951 | Winslow . | |
| 2,580,312 | 12/1951 | Moore . | |
| 2,584,667 | 2/1952 | Bockrath . | |
| 2,589,994 | 3/1952 | Custer | 244/48 |
| 2,623,712 | 12/1952 | Spratt . | |
| 2,678,783 | 5/1954 | Myers | 244/7 B |
| 2,708,081 | 5/1955 | Dobson . | |
| 2,874,920 | 2/1959 | Mallinckrodt | 244/34 R |
| 2,953,322 | 9/1960 | Lewis | 244/48 |
| 2,959,373 | 11/1960 | Zuck | 244/48 |
| 2,960,285 | 11/1960 | Lopez . | |
| 3,006,582 | 10/1961 | Geiger . | |
| 3,035,789 | 5/1962 | Young . | |
| 3,036,794 | 5/1962 | Mallinckrodt | 244/34 R |
| 3,147,938 | 9/1964 | Danner | 244/48 |
| 3,166,271 | 1/1965 | Zuck . | |
| 3,236,182 | 2/1966 | Dahm . | |
| 3,415,469 | 12/1968 | Spratt . | |
| 3,430,894 | 3/1969 | Strand et al. . | |
| 3,477,664 | 11/1969 | Jones . | |
| 3,561,702 | 2/1971 | Jones . | |
| 3,587,770 | 6/1971 | Flower . | |
| 3,653,611 | 4/1972 | Trupp et al. | 244/48 |
| 3,730,459 | 5/1973 | Zuck . | |
| 3,795,373 | 3/1974 | Gerard . | |
| 3,934,843 | 1/1976 | Black . | |
| 3,966,142 | 6/1976 | Corbett et al. . | |
| 4,124,180 | 11/1978 | Wolowicz . | |
| 4,415,132 | 11/1983 | Shirk . | |
| 4,568,043 | 2/1986 | Schmittle . | |
| 4,596,368 | 6/1986 | Schmittle . | |
| 4,730,795 | 3/1988 | David . | |
| 4,928,907 | 5/1990 | Zuck . | |
| 4,967,984 | 11/1990 | Allen . | |
| 5,098,034 | 3/1992 | Lendriet . | |

FIG. 1
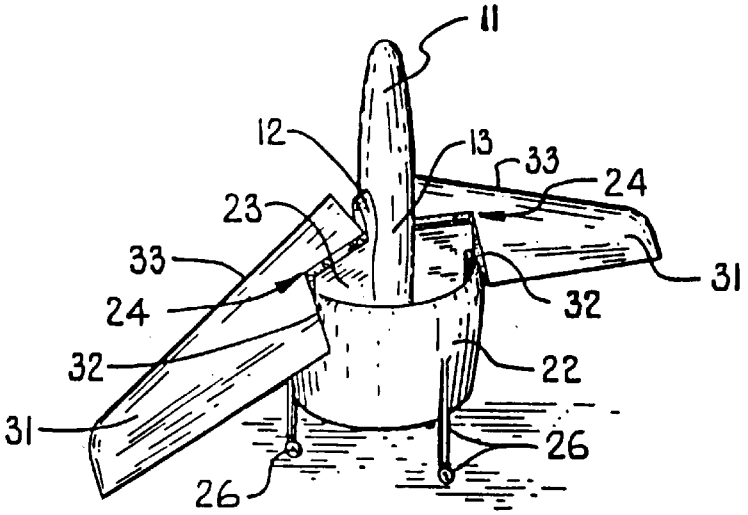
FIG. 2
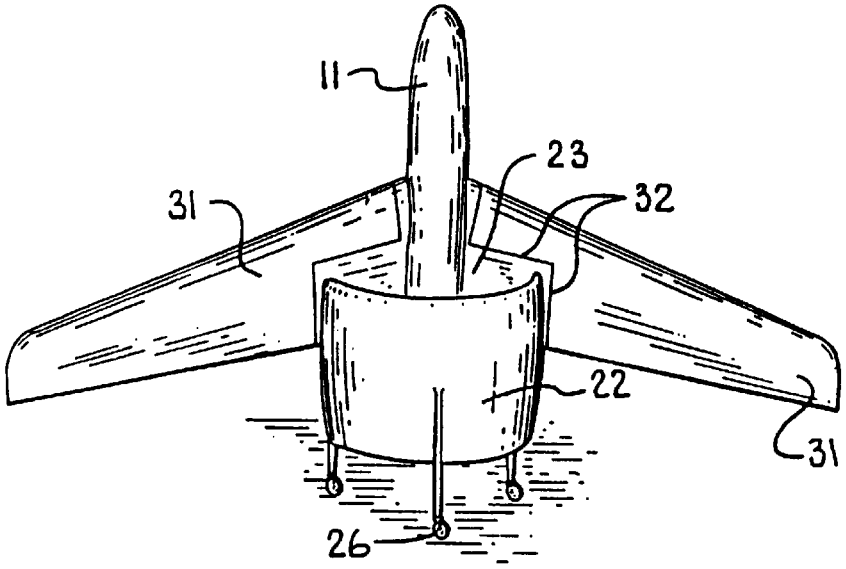
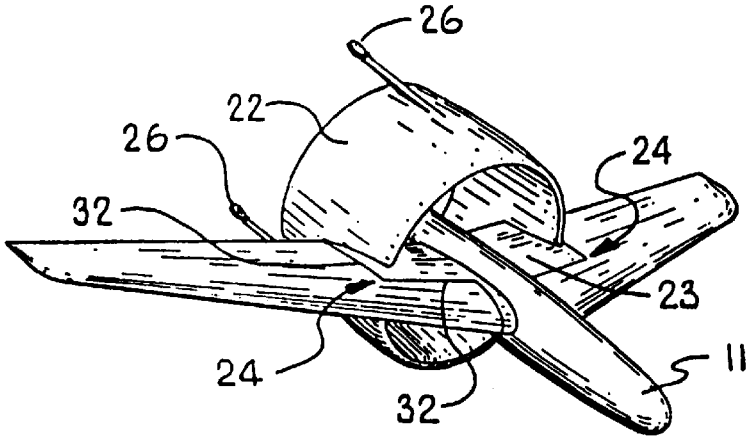
FIG. 3

FIG. 4
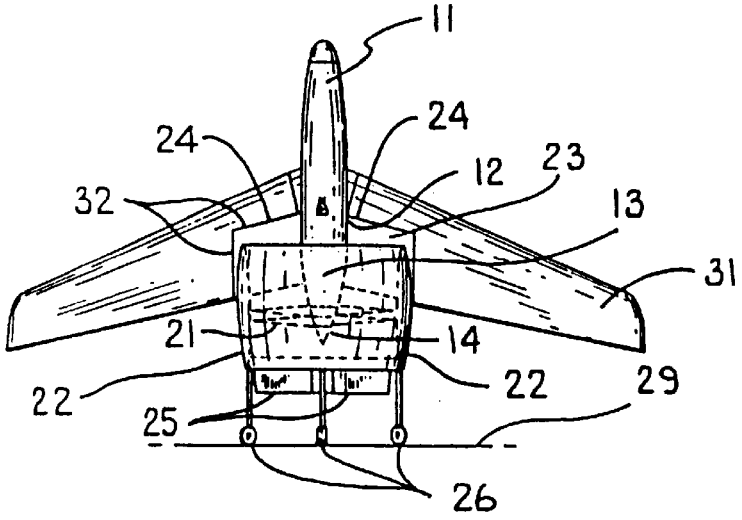
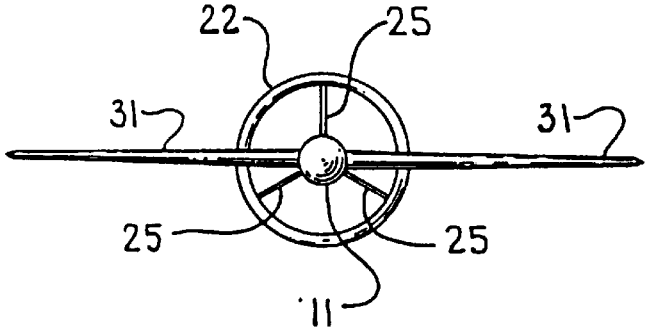
FIG. 5
FIG. 6
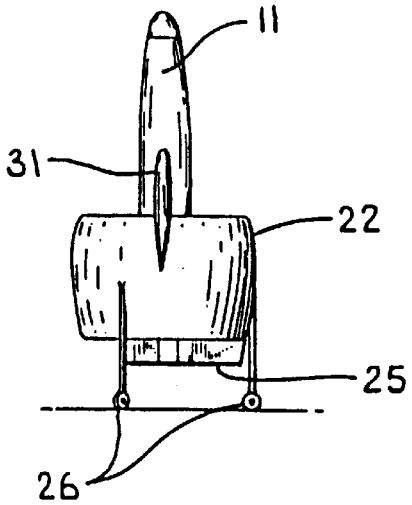

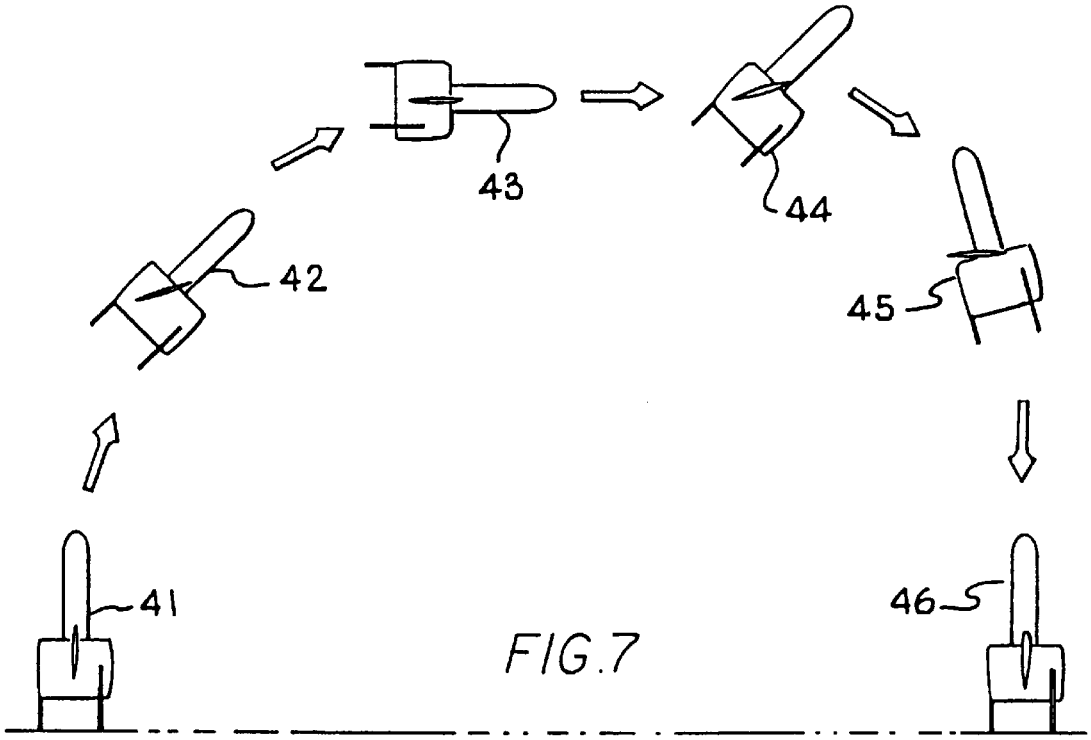
FIG.7
FIG.13
PRIOR ART
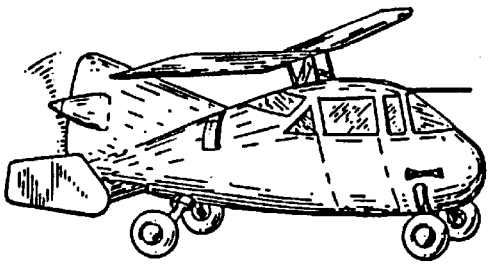
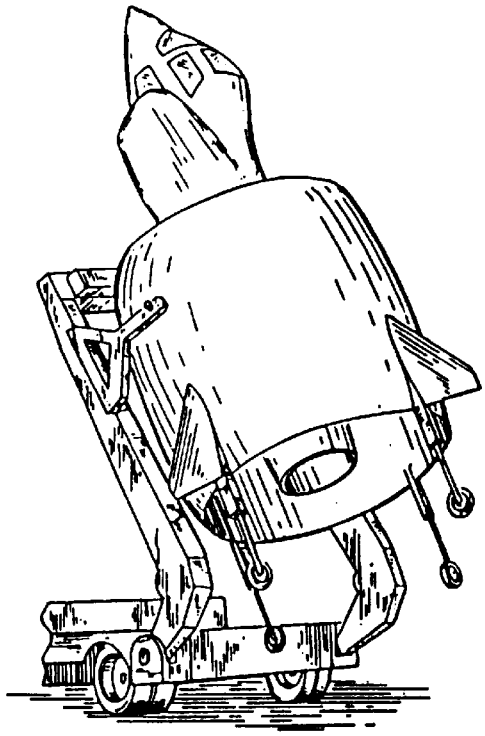
FIG.8
PRIOR ART

AIRPLANE WITH VARIABLE-INCIDENCE WING

Matter enclosed in heavy brackets [ ] appears in the original patent but forms no part of this reissue specification; matter printed in italics indicates the additions made by reissue.

*This application is a continuation of application Ser. No. 08/195,247 filed Feb. 14, 1994 which is a Re of 07/308,655 filed Feb. 9, 1989, now U.S. Pat. No. 5,086,993.*

BACKGROUND

1. Field of the Invention

This invention relates generally to vertical-takeoff-and-landing (VTOL) airplanes; and more particularly to tail-sitting aircraft capable of hovering flight, generally vertical takeoff and landing, and substantially horizontal forward flight.

2. Prior Art

Two types of prior aircraft are pertinent to my invention:

ducted -fan craft, such as the French Coleopter (FIG. 8) and the 1972 Shorts Skyspy; and "free wing" or "floating wing" craft in which the wing pivots about a spanwise axis, and is free to float in response to gusts. FIGS. 9 through 12 show a craft of this type, designed by Spratt.

In operation near hover, for a given diameter and power, a ducted fan produces more static thrust than an unducted propeller. The Coleopter enjoys this important advantage. Following is an excerpt from Taylor, J. W. R., ed., Jane's Pocket Book of Research & Experimental Aircraft (1976), at page 221, on the "SNECMA C.450-01 Coléopterère". FIG. 8 has been adapted from page 220 of the same work.

"Power plant: One SNECMA Atar 101E V turbojet engine (8,157 lb. 3,700 kg st).

"Diameter of wing: 10 ft 6 in (3.20 m).

"Length: 26 ft 3½ in (8.022 m).

"Accomodation: Pilot only.

"Special design features: Annular wing of light alloy construction, consisting of two skins and internal structure (chord 9 ft 10 in, 3.0 m). Retractable foreplanes in fuselage nose. Cruciform fins and rudders to provide directional control in all axes. Four oleo-pneumatic landing legs mounted on trialing-edge of wing, small castoring wheels with rubber tyres. Tilting pilot's seat which could be ejected in an emergency.

"History: Initial tests with the 'Atar Volant' pilotless and piloted test vehicles proved the ability of a vertically-mounted turbojet to raise a VTOL aircraft safely from the ground, to accelerate it is vertical flight to a speed where it could become airborne like a conventional aircraft, and to return it to the ground in a vertical descent. SNECMA then built a prototype research aircraft around this type of power plant. Known as the C.450-01 Coléoptère, this prototype was basically similar to the C.400 P-3 piloted 'Atar Volant', but was fitted with an annular wing to permit transition into horizontal flight. The airframe, built by the Nord company in its Chatillonsous-Bagneux works, was intended for tests at subsonic speeds. Directional control at take-off and landing was by pneumatic deflection of the main jet efflux, directional control during normal horizontal flight was by four swiveling fins equally spaced around the rear of the annular wing. Under an agreement signed in 1958, the Federal German Ministry of Defence collaborated with SNECMA in this research programme. The C.450-01 made the first free vertical flight on May 6, 1959 at Melun-Villaroche, but on July 25, during a transition from vertical to horizontal flight, control of the aircraft was lost and it crashed from 250 ft (75 m). Although the aircraft was destroyed the pilot ejected successfully. Testing the Coléopière, however, was considered to have been successful despite the accident."

In cruise, the Coleopter is handicapped by having a wingspan that is small (i.e., equal to the duct diameter). This small causes span the cruise induced drag (drag due to lift) to be unacceptably high.

Several free-wing aircraft have been proposed and built. I do not know of any that have claimed static-thrust capability, although a brochure of the Allen Aircraft Company does describe an aircraft with capability of takeoff and landing over short distances. Excerpts (not necessarily in their original order) follow.

"The GEMINI TURBOPROP-350 is a new, innovative, single-engine, special performance aircraft. The GTP-350 is powered by Allison's soon-to-be-certified turbine, the 225-B10, delivering 350 shaft horse power (SHP). Combining the 225-B10 with the low weight, high strength characteristics of Allied's SPECTRA and COMPET Fibers creates a high-performance state-of-the-art aircraft. What really sets the GTP-350 apart, however, is the patented Slaved Tandem Freewing design; this configuration provides dramatic safety improvements as well as giving the plane near vertical take-offs and landings (VTOL). This brochure tells the story of the revolutionary GEMINI TURBOPROP-350. . . .

"SPECIFICATIONS

"The fully acrobatic GTP-350 is designed for multi-mission applications. Proposed applications include training such as high maneuverability aerial combat; high performance off-airport operations such as medical and other evacuation from remote areas; close support of combat troops with helicopter-like performance; border patrol, reconnaissance, agricultural and wide area land management missions and general purpose use. The GTP-350, presently available without an FAA certificate (as either a kit or an exempt airplane), is excepted to receive FAA Part 23 certification. Allen Aircraft Company presently has production capacity for 10 GTP-350s per year. Substantial contribution to the development effort was made by Allison Division or General Motors Corporation. . . .

"DIMENSIONS, EXTERNAL

| | |
|---|---|
| Wing span | 38.33 ft. |
| Chord at root | 5.83 ft. |
| Chord at tip | 3.83 ft. |
| Mean Aerodynamic Chord | 5.45 ft. |
| Wing Aspect Ratio | 7.60 |
| Wing taper ratio | 0.67 |
| Sweep | 4.00 deg. |
| Length overall | 20.54 ft. |
| Fuselage: max width | 4.50 ft. |
| max depth (excluding ascelle) | 4.20 ft. |
| Height overal | 9.38 ft. |
| Rear wing span | 25.33 ft. |
| Rear wing chord at root | 3.83 ft. |
| Rear wing chord at tip | 2.33 ft. |
| Wheel track | 8.33 ft. |
| Wheel base | 5.33 ft. |

-continued

| | | |
|---|---|---|
| Propeller diameter | 85.0 | inches |
| Propeller ground clearance | 2.28 | ft. |
| "DIMENSIONS, INTERNAL: | | |
| Cabin: | | |
| max length | 9.80 | ft. |
| max width | 3.41 | ft. |
| max height | 3.50 | ft. |
| "AREAS: | | |
| Wings, gross | 187.72 | sq. ft. |
| Ailerons, total | 33.68 | sq. ft. |
| Exposed vertical fin | 41.43 | sq. ft. |
| Rudder | 9.23 | sq. ft. |
| Rear wings, gross | 78.48 | sq. ft. |
| "WEIGHTS and LOADINGS: | | |
| Basic weight empty (typical equipment) | 754 | lbs. |
| Maximum take-off weight (aerobasic) | 1500 | lbs. |
| Maximum take-off weight (utility) | 2200 | lbs. |
| Fuel, max capacity | 700 | lbs. |
| Maximum wing loading | 11.5 | lbs./sq. ft. |
| Maximum power loading | 6.28 | lbs./shp |
| "PERFORMANCE: | | |
| Never exceed speed | 230 | mph |
| Maximum level speed at sea level | 190 | mph |
| 75% normal cruise | 173 | mph |
| Minimum level speed, no vectored thrust | 70 | mph |
| Minimum controllable speed, full thrust vectoring | 20 | mph |
| Maximum sustainable climb angle | 90 | degrees |
| Maximum climb rate at sea level | 3520 | fpm |
| Take-off run, no vectored thrust | 1200 | ft. |
| Take-off run, full thrust vectoring | 75 | ft. |
| Landing roll out, no vectored thrust | 600 | ft. |
| Landing roll out, full thrust vectoring | 65 | ft. |
| Service ceiling | 25,000 | ft. |
| Range with 45 min. reserves | 800 | n.m. |
| g limits, max aerobatic TOW | +6/−3 | |
| g limits, max utility TOW | +4.4/−2.2 | |

HISTORY OF THE GEMINI TURBOPROP-350 PROJECT

"The GEMINI TURBOPROP-350 (GTP-350) lineage began prior to World War II when George K. Spratt and Daniel R. Zuck independently invented pure 'freewing' design aircraft. Spratt, the more active researcher or the two, has designed, built and flown more than a dozen freewing vehicles. Further development came in the 1950s and 60s when several other researchers—including teams from NASA, General Dynamics and Battelle Memorial Laboratories [--] reported the study, building and successful flying of freewing designs. "In early 1977, Edward H. Allen, Ph.D., a professional systems scientist and experienced pilot, began to examine freewing development and perform experiments that eventually led to the formulation of a new concept—the 'Slaved Tandem Freewing' (STF) configuration. Dr. Allen believed that theoretically the new configuration could be shown to be 10 times safer than existing general aviation aircraft. As a result, when the U.S. Department of Transportation requested proposals in 1984 for innovative means to reduce accidents and increase the safety of vehicles, Dr. Allen submitted a proposal for developmental funding of the STF design. A feasibility study contract was awarded by the DOT and after evaluating the results of that study, a two-year, follow-on contract for additional development work was awarded—including the design, manufacture and testing of a manned prototype. The DOT-sponsored work included the testing of four subscale, remotely piloted research vehicles (RPRVs . . .)—the largest of which had a 17-foot wing span and weighed more than 100 pounds. The [RPRVs] served to demonstrate the concept and the GEMINI TURBOPROP-350 was born.

"Construction of the full-scale manned prototype began early in 1987. Flight testing is scheduled to begin with ground tests and system check-out in October 1987, with the first flight the following month.

"THRUST VECTORING: THE SECRET TO NEAR VTOL

"The GEMINI TURBOPROP-350 is the world's first aircraft to offer near vertical takeoff and landing performance without the mechanical complexity of a helicopter—and without losing high speed performance. The unique STF configuration allows the pilot to control deck angle independent of the wing's angle of attack. By rotating the fuselage to a high angle of attack while leaving the wings in a level flight attitude, the pilot is able to direct or 'vector' the thrust. The benefit of this 'extreme flair [sic]' landing and takeoff maneuver is the ability to operate from confined areas with little takeoff run and even less landing roll.

"SAFETY-THE VALUE OF THE STF CONCEPT

"Ease of operation and inherent safety in vehicle design are the greatest strengths of the STF concept. Of primary importance is the fact that STF vehicles cannot be stalled or spun in the dramatic way that fixed wing aircraft can. In addition, the natural tendency of an STF system to reduce the shocks from sudden changes in wind direction—the 'gust allevation' tendency—is as important as stall resistance. In aerodynamic vehicles, the freewing is comparable to an automobile's suspension system . . . : it provides a safe and comfortable flight."

A related prior aircraft, the Spratt/Stout Skycar, is shown in FIG. 13—which is adapted from Bowers, Unconvenional Aircraft (1984), page 195. The accompanying test at pages 194 and 195 of that same work follows.

"Spratt Wing/Stout Skycar IV

"Since 1930, famous American designer William B. Stout had been trying to develop an easy-to-fly 'everyman's airplane' through his series of Skycars. At the end of World War II he teamed up with George Spratt of the Stout Research Division or Convair, who had been developing airplanes with movable wings for several years. The Spratt/Stout collaboration, identified as Skycar IV, was built by Convair when that firm became interested in flying automobiles in 1946.

"The Spratt wing was similar to that of the Mignet Flying Flea in being the primary pitch control for the airplane, but did much more in that it was also pivoted in such a way that it could be banked to put the plane in a turn. The wing was mounted above an elongated auto-like body with a buried engine driving a pusher propeller at the rear through an extension shaft [see FIG. 13]. The fixed end finds were used for stability only, not control. With the movable wing, there was no need for elevators, rudder, or ailerons.

"This proof-of-concept prototype concentrated more on the aerodynamic details than the automotive. Although this one, for which technical data is conspicuously absent, was abandoned, Mr. Spratt is still developing aircraft with his wing at this writing."

Allen's and Spratt's craft are relatively complex in that each requires a separate horizontal tail. Moreover, neither is intended to hover. The wing bending moments are carried on a shaft; this wastes weight, because the shaft must be relatively large and heavy.

SUMMARY OF THE DISCLOSURE

A first preferred embodiment of my invention is an aircraft for hovering flight, generally vertical takeoff and landing, and substantially horizontal forward flight. It includes a fuselage that has a generally longitudinal axis.

It also includes some means for standing the aircraft for vertical takeoff and landing, with the fuselage axis substantially vertical, on a landing surface. For generality and breadth of expression I shall refer to these means as the "support means".

This preferred embodiment also includes some means for propelling the aircraft in both (a) hovering and vertical flight and (b) substantially horizontal forward flight. These means comprise at least one ducted fan, and—again for generality and breadth—I shall call them the "ducted-fan means" or simply the "fan means". The fan means are supported from the fuselage aft.

This preferred embodiment must also include some means, comprising at least one floating wing, for providing lift in forward flight. These means—once again for generality the "floating-wing means"—are supported from the fuselage, at each side or the fuselage, for passive rotation about a generally spanwise axis.

The fuselage-axis attitude varies between substantially vertical in hovering and vertical flight, and generally horizontal in forward flight.

The foregoing may be a description of the first preferred embodiment of my invention in its most general or broad form. From what has already been stated, it can now be appreciated that my invention resolves the above-noted fundamental in adequacies of the prior art.

In particular, as compared to prior free-wing configurations of, e.g., Spratt and Stout, my invention shares the advantages of the Coleopter's ducted fan—namely, the very high level of available static thrust that is of enormous value for efficient VTOL and hover operation, and also the greater safety of the guarded fan. On the other hand, by adding a wing that can be of far greater span than the duct diameter, my invention provides induced-drag levels comparable with those of a conventional airplane configuration—and thus is vastly superior in cruise performance to all prior flying-duct craft. Added safety advantages accrue from the stall resistance of the floating wing.

As will be appreciated, however, I prefer to contemplate practice of my invention with certain additional characteristics or features that provide the fullest enjoyment of its potential benefits and advantages.

For example, the fuselage is preferably substantially unarticulated, at least between (1) an attachment location of the floating-wing means to the fuselage and (2) the fan means. Preferably the fuselage is substantially unitary and unarticulated—i.e., along its entire length.

As another example, I prefer that the fan means comprise exactly one fan (which may be a contrarotating fan), of adequate size for efficient operation in hovering flight; and that the fan be substantially the only means of propulsion in vertical takeoff and landing, hover, and forward flight.

In this latter case I prefer that the fan means also comprise a generally cylindrical duct surrounding the fan and generally surrounding an aft segment of the fuselage; and some means for vectoring thrust developed by the fan. These "thrust-vectoring means" (considered as a unit) are fixed relative to the fuselage.

I also prefer that the thrust-vectoring means comprise a plurality of deflection vanes, each mounted for rotation about a respective axis. The axis of rotation of each vane is fixed in relation to the fuselage and the duct, aft of the fan. Full control capability for hover is provided by use of these movable vanes located near the duct exit.

In addition I prefer that the fan be fixed, relative to the fuselage, for rotor rotation about exclusively an axis substantially parallel to the fuselage axis. I also prefer to include a mechanical stop for limiting passive rotation of the wing to an attitude suited for rapid forward flight.

I further prefer that the spanwise axis of rotation of the floating-wing means be along a surface of the wing; and that this embodiment of my invention further comprise a long hinge supporting the floating-wing means for rotation about the spanwise axis. The spanwise axis is preferably along a lower surface of the wing.

Thus, compared with the Allen or Spratt craft, the "break" in the wing is arranged differently—in such a way that wing bending moments are resisted by the long hinge, instead or being carried on a single short shaft. This saves weight, since the hinge pin can be made smaller and lighter than a shaft.

Moreover I prefer that this embodiment of my invention also comprise, at each side of the fuselage, a wing segment that is fixed to the fuselage against rotation. In this case the floating-wing means preferably define, along trailing portions thereof, a corner notch or slot generally near the fuselage; and forward portions of the fixed wing segment are preferably disposed within that slot in the floating wing.

In a second preferred embodiment of my invention, the aircraft is further expressly understood to be also for transitional flight between vertical and horizontal flight. The fan means propel the craft in vertical, horizontal and transitional flight.

The wing is supported for rotation as in the first embodiment; but as further explained below this rotation is not necessarily passive. In this embodiment, during vertical and transitional flight the leading edge of the wing is down relative to the fuselage axis.

A third preferred embodiment of my invention is comparable to the second, except that the leading-edge-down condition is not necessarily satisfied. Instead it is expressly understood that the rotating wing provides lift in transitional as well as horizontal flight and that the wing incidence in transitional flight is substantially always within a small range of angles of attack with respect to an oncoming airstream.

As to the second and third embodiments, I prefer that the wing incidence be controlled by actuators, at least during transitional flight; and that the actuators be scheduled by a flight-control system. Advantages of these embodiments will become more clear from the detailed description that follows.

All of the operational principles and advantages of the present invention will be more fully appreciated upon consideration of the following detailed description, with reference to the appended drawings, of which:

BRIEF DESCRIPTION OF THE DRAWINGS

FIG. 1 is a perspective view of a preferred embodiment of my invention in its tail-sitting orientation, but showing the rotatable wing angled relative to the fuselage as for transitional flight.

FIG. 2 is a like view of the FIG. 1 embodiment, but with the wing aligned with the fuselage as for generally horizontal cruising flight.

FIG. 3 is a perspective view of the same embodiment with the fuselage oriented horizontally, also as for generally horizontal cruising flight.

FIG. 4 is an elevation of the same embodiment in its tail-sitting orientation, viewing the broad surfaces of the wing substantially straight on—i.e., from the viewpoint that would be above the craft if it were in flight.

FIG. 5 is a plan view or the same embodiment, still in a tail-sitting orientation—i.e., a view that would correspond to a front elevation of the craft, if it were in flight.

FIG. 6 is an elevation of the same embodiment, similar to FIG. 4 but taken viewing the wing at one side of the craft edge on—i.e., from the viewpoint that would be at one side of the craft if it were in flight.

FIG. 7 is a composite elevation showing the craft—very diagrammatically or schematically—in successive stages of operation from tail-sitting position for takeoff through ascending transition, cruise, and descending transition into a tail-sitting landing.

FIG. 8 is an elevation (after Taylor, supra, at 220) of the prior-art Coleopter with its special truck-mounted hoist.

FIG. 13 is a perspective view of the Spratt Wing/Stout Skycar IV (after Bowers, supra, at 195).

DETAILED DESCRIPTION OF THE PREFERRED EMBODIMENTS

1. General Configuration and Operation

Figure 9:
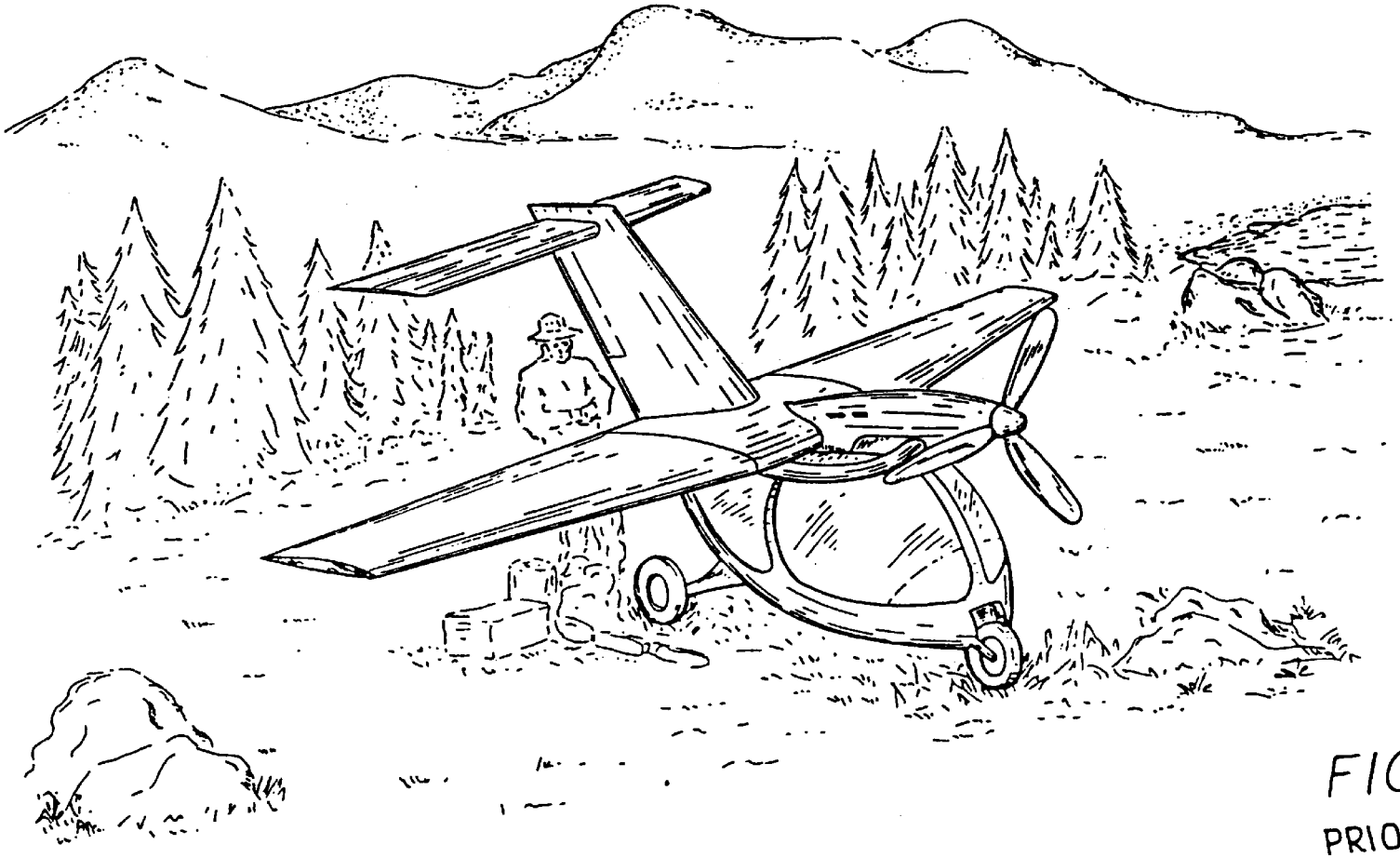
FIG. 9 PRIOR ART
FIG. 9 is a perspective view (after promotional literature of the Allen Aircraft Company) of the prior-art Gemini Turboprop-350 (understood to be a trademark of that firm) in an environment characteristic of that craft's short takeoff-roll and short landing-rollout distances.
Figure 10:
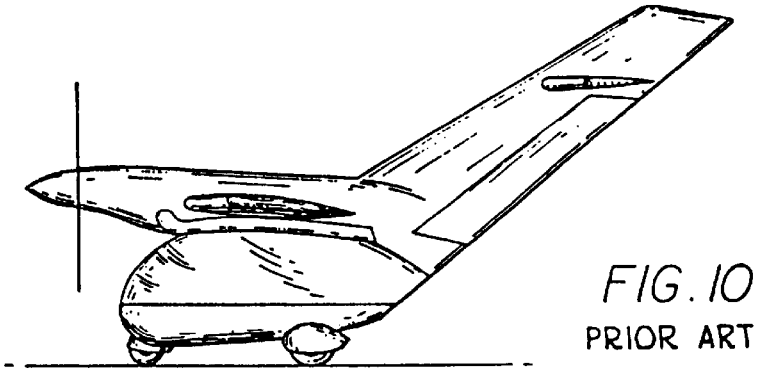
FIG. 10 PRIOR ART
FIG. 10 is a diagrammatic side elevation (ibid.) of the same prior-art craft in a preliminary takeoff-roll or landing-rollout orientation wherein the fuselage is generally horizontal.
Figure 11:
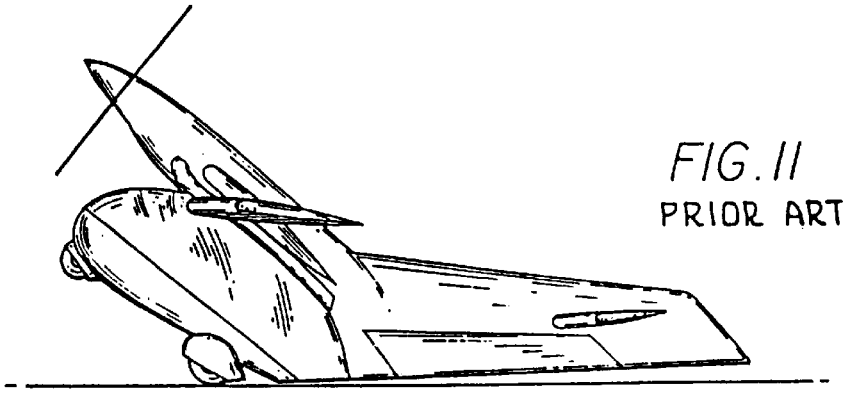
FIG. 11 PRIOR ART
FIG. 11 is a like view (ibid.) of the same craft in a later stage of takeoff roll, in which the fuselage is oriented steeply upward.
Figure 12:
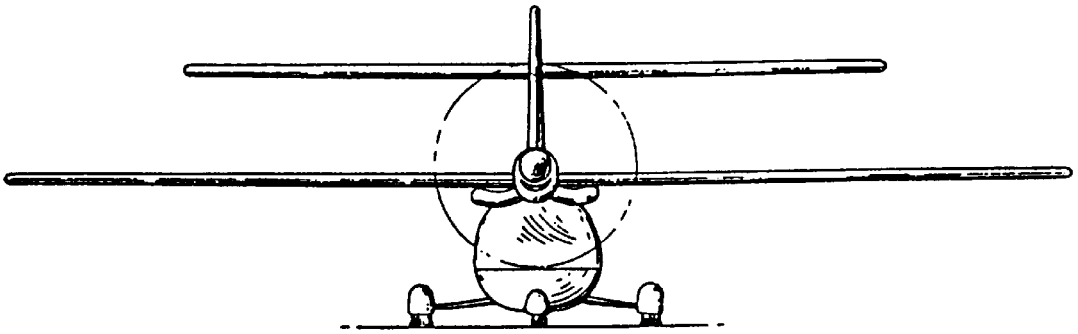
FIG. 12 PRIOR ART
FIG. 12 is a front elevation (ibid.) of the same craft in its FIG. 10 orientation.

The configuration of my contemplated vehicle is shown in FIGS. 1 through 6. Thrust is provided by an aft-mounted, ducted 22, preferably contrarotating fan 21 (FIG. 4). Vanes 25 in the fan efflux provide control about all three axes in cruise as well as when the vehicle is hovering.

The wing 31 is pivoted along an approximately spanwise axis 24 (FIG. 1), allowing the wing to vary in angle of attack. There are at least three wing-incidence control options:

- fully-floating wing;
- floating wing which couples with body or fuselage 11 incidence at low angles of attack; and
- wing incidence controlled by actuators and scheduled by a flight-control system.

In the first of these options, the combination of hinge axis 24 and wing pitching-moment coefficient at zero lift are tailored so that the wing tends to float at a lift coefficient near the maximum value.

In the second option, stops are arranged so that the wing may only float leading-edge-down relative to the body. These stops, in conjuction with the floating characteristics just mentioned, cause the wing and body to remain coupled as long as the body angle of attack is lower than the trimmed floating angle of attack of the wing (typically about fifteen degrees).

In this mode, the vehicle flies and maneuvers like a conventional, rigid airplane. At body angles of attack in excess of the wing trimmed floating angle of attack, the wing decouples from the body and floats at its designed angle of attack.

In the third option the incidence angle can be programmed for various objectives. (For example, it may emulate either of the first two options but with optimized dynamic response.)

Lateral (roll) control options include at least these:

- spoilers on outboard wings;
- ailerons which are locked out when the wing is floating;
- ailerons scheduled by a flight-control system such that they control wing incidence when the wing is floating and operate in the same manner as conventional ailerons when the wing is locked:
- differential variation of wing incidence about a "tilting" hinge axis; and
- all roll control by differential deflection of vanes 25 in the fan duct.

Antitorque control possibilities include at least these three strategies:

- dual-rotation fans 21 (FIG. 4)—i.e., a contrarotating fan;
- a single-rotation fan plus antitorque stator vanes; and
- an antitorque rotor or reaction-control antitorque system.

Note from FIGS. 1 through 4 the wing segment 23 that is fixed to the fuselage 11 against rotation, and structurally integrated with the duct 22—very firmly securing the duct to the fuselage. As is clear from the illustrations, some forward portions of this fixed wing segment 23 are disposed within a corner notch or slot 32 that is formed in the rotating wing 31, generally near the fuselage.

2. Transition and Conversion

FIG. 7 illustrates the transition and conversion process. For definiteness the following discussion is in terms of the second wing-incidence control option, though as will be understood the process may be described equally straightforwardly for the other two.

Transition from takeoff or hover 41 to cruise 43 is accomplished by progressively tilting the body 11 from the vertical. As forward speed builds, the floating wing develops progressively more lift—allowing the body 11 and fans 21 to nose down, which increases the forward component of thrust and decreases the lift component of thrust.

When the body angle of attack decreases to the wing floating angle of attack, the wing and body couple. The vehicle then flies in the manner of a conventional rigid airplane.

Conversion from cruise to hover or landing 46 begins with a steady, one-g, wing-borne deceleration. When the airspeed falls to the point that the wing is flying at its designed floating lift coefficient in order to support the aircraft in level flight, the body angle of attack equals the trimmed float angle of attack of the wing.

As deceleration proceeds, the body rotates to a more nose-up attitude 44, 45 and the wing decouples from the body and remains floating at its trimmed angle of attack. This allows the vehicle to fly at body angles of attack above the stall angle of attack of the wing without stalling the wing.

When the body and duct angle of attack pass through the critical duct-flow separation angle-of-attack range (typically thirty to forty degrees), the wing is still generating considerable lift—unloading the fans and duct, and greatly decreasing duct buzz or flow separation. Conversion from wingborne flight to hover is accomplished by progressively nosing up the body until it is oriented vertically 46.

The wing floats at its designed angle of attack throughout the conversion 44, 45. This allows a progressive transfer of lift from the wing to the fans as the vehicle decelerates.

3. System Simplicity

The tilt-body craft is much simpler than other VTOL vehicles. It requires almost no additional systems besides the wing hinges 24 (at the underside of the wing, FIG. 1) and the duct to give an otherwise conventional plane VTOL capability.

The same propulsion system is used for powered lift and cruise propulsion. There is no need for cross-shafting, rotor-tilt actuators and systems, or angle-drive gearboxes.

The fans 21 may be made fixed-pitch, although they are no more complex than conventional variable-pitch propellers in any case. There is no need for cyclic pitch-control mechanisms. Control in both hover and cruise is provided by at least three stator vanes 25 mounted in the fan efflux.

In cruising flight the vanes 25 merely replace the elevators, rudder and ailerons of a conventional airplane. In VTOL and hover the same vanes perform the functions normally associated with cyclic pitch and tail-rotor variation for a conventional helicopter.

The tilt-body therefore requires no more control actuators than a conventional airplane. The control system can be quite simple, since all of the controls operate in the same sense in cruise and hover.

4. Operational Advantages

For operations from confined areas 29 (FIG. 1) and aboard ships, the tilt-body offers a large improvement in ease of handling and safety over prior aircraft, including prior remotely-piloted vehicles (RPVs). The VTOL capability of the craft allows it to be launched and recovered without special equipment such as catapults, JATO bottles or recovery nets.

The ducted propulsion system is fully enclosed. Unlike the rotors of a helicopter or tilt-rotor vehicle, it poses little threat to nearby personnel.

Incorporation of the floating wing gives the tilt-body a much wider transition corridor than either fixed-wing tail-sitting vehicles or pure "flying duct" vehicles such as the SkySpy, or the Coleopter. The wing also gives the tilt-body a far lower span-loading and hence greatly improved altitude and loiter performance than a "flying duct" vehicle.

Hover performance of the tilt-body lies between that of a low-disc-loading vehicle like a helicopter or tilt-rotor craft and a high-disc-loading vehicle like a vectored-thrust jet-lift craft. Incorporating the duct 22 improves hover efficiency. Unlike a tilt-rotor, the tilt-body does not suffer from rotor-induced downloads on the wings.

5. Performance

The combination of sufficient power to hover with a clean, low-drag airframe yields exceptional performance in horizontal flight. Based on computer modeling, a preferred embodiment of my invention can fly at sustained altitudes up to 40,000 feet and has a sea-level top speed of 248 knots. The combination of high speed and VTOL capability give the tilt-body the ability to provide quick response, particularly when the VTOL capability is exploited to allow forward basing.

Following is a calculated performance summary for a preferred embodiment of my tilt-body vehicle that is described by the specifications indicated.

BASELINE SPECIFICATIONS

| | |
|---|---|
| control type | RPV |
| span | 15 feet |
| area | 32 square feet |
| span efficiency | 0.850 |
| aspect ratio | 7.03 |
| weight | 430 pounds |
| fuel fraction | 0.1 |
| power | 150 shaft horsepower |
| fan diameter | 4 feet |
| prop efficiency | 0.900 |
| payload | 134 pounds |

BASELINE PERFORMANCE
drag buildup
parasite drag buildup

| | |
|---|---|
| fuselage D/Q | 0.10000 |
| wing D/Q | 0.32000 |
| empennage D/Q | 0.37000 |
| gear D/Q | 0.00000 |
| additional D/Q | 0.00000 |
| interference | 0.04740 |
| total airplane | 0.83740 |
| CD minimum | 0.026 |
| $C_D/C_L^2$ | 0.053 |
| L/D maximum | 13.39 |
| $C_L$ at L/D maximum | 0.700 |

CRUISE PERFORMANCE

| | at altitude (feet) | | |
|---|---|---|---|
| parameter | 0 | 20.000 | 40.000 |
| minimum power (THP) | 6.50 | 8.91 | 13.11 |
| maximum engine power (SHP) | 150.0 | 72.9 | 25.6 |
| maximum speed (KTAS) | 248.7 | 239.2 | 200.8 |
| 75% cruise (KTAS) | 225.7 | 215.9 | 169.7 |
| $C_L$ at 75% power cruise | 0.078 | 0.159 | 0.550 |
| maximum rate of climb (FPM) | 5,386.01 | 2,403.50 | 355.01 |
| climb power (THP) | 89.8 | 45.3 | 18.7 |
| climb $C_L$ | 0.2500 | 0.4500 | 0.8000 |
| climb speed (KTAS) | 126.1 | 128.7 | 142.0 |
| climb gradient | 0.42220 | 0.18452 | 0.02470 |
| 1-g wing-dccouple speed (KTAS) | 57.5 | 78.8 | 116.0 |
| best climb gradient | 0.65354 | 0.23871 | 0.023539 |
| best angle-of-climb speed (KTAS) | 57.5 | 78.8 | 133.9 |
| loiter endurance (hours) | 12 | 9.5 | 6 |

HOVER PERFORMANCE
at sea level

| | |
|---|---|
| figure of merit | 0.60 |
| static thrust (pounds) at maximum power | 485 |
| thrust/weight ratio at | 1.12 |
| maximum power and gross weight | 25 |
| hover endurance (minutes) | |

6. System Development

The information presented in this document is believed lo be sufficient to enable persons of ordinary skill in the art of aircraft development to practice my invention—i.e., to refine the design and build the craft—in a generally routine fashion. Some of the steps contemplated for such development are discussed below.

The till-body craft would benefit from both force-balance-mounted wind-tunnel testing and free-flying tests. The latter would be particularly useful in defining the aircraft transition corridor and in refining control strategies for hovering and transition. In either case, power effects are sufficiently dominant that testing must be done with a powered model.

The tilt-body aircraft could be demonstrated by constructing and flying a scaled-down radio-controlled model of the proposed operational tilt-body vehicle. Flight-testing of the model would demonstrate the controllability of the vehicle over its entire night envelope, including hover, transition and conversion.

It will be understood that the foregoing disclosure is intended to be merely exemplary, and not to limit the scope of the invention—which is to be determined by reference to the appended claims.

I claim:

1. An aircraft for hovering flight, generally vertical takeoff and landing, and substantially horizontal forward flight, comprising:

a fuselage having a generally longitudinal axis;

support means for standing the aircraft for vertical takeoff and landing, with the fuselage axis substantially vertical, on a landing surface;

ducted-fan means, supported from the fuselage aft, for propelling the aircraft in both (a) hovering and vertical flight and (b) substantially horizontal forward flight; and at each side of the fuselage, floating-wing means, supported from the fuselage for passive rotation about a generally spanwise axis, for providing lift in forward flight;

wherein the fuselage-axis attitude varies between substantially vertical in hovering and vertical flight, and generally horizontal in forward flight.

2. The aircraft of claim 1, wherein:

at each side of the fuselage, the floating-wing means are supported from the fuselage at an attachment location; and at least between the wing-means attachment locations and the fan means, the fuselage is substantially unarticulated.

3. The aircraft of claim 1, wherein:

the fuselage is substantially unitary and unarticulated.

4. The aircraft of claim 1, wherein the fan means comprise:

exactly one fan, of adequate size for efficient operation in hovering flight;

said one fan being substantially the exclusive means of propulsion for the aircraft in vertical takeoff and landing, hover, and forward flight;

a generally cylindrical duct surrounding the fan and generally surrounding an aft segment of the fuselage; and means, fixed in relation to the fuselage, for vectoring thrust developed by the fan.

5. The aircraft or claim 4, wherein:

the thrust-vectoring means comprise a plurality of deflection vanes, each mounted for rotation about a respective axis that is fixed in relation to the fuselage and the duct, aft of the fan.

6. The aircraft of claim 4, wherein:

the fan is fixed, relative to the fuselage, for rotor rotation about exclusively an axis substantially parallel to the fuselage axis.

7. The aircraft of claim 1, wherein:

the ducted-fan means comprise:

a fan, and a generally cylindrical duct surrounding the fan, and generally surrounding a segment of the fuselage; and the floating-wing means extend outboard beyond the duct.

8. The aircraft of claim 7, wherein:

the outboard extension or the floating-wing means beyond the duct is larger than the duct diameter.

9. The aircraft of claim 7, further comprising:

at each side of the fuselage, a wing segment fixed to the fuselage against rotation;

wherein the floating-wing means define, along trailing portions thereof, a corner notch or slot generally near the fuselage; and wherein forward portions of the fixed wing segment are disposed within the notch or slot in the foaling wing.

10. The aircraft of claim 9:

wherein the spanwise axis is along a surface of the wing; and further comprising a long hinge supporting the floating-wing means from the fixed wing segment, within the notch or slot, for rotation about the spanwise axis.

11. The aircraft of claim 1:

wherein the spanwise axis is along a surface of the wing; and further comprising a long hinge supporting the floating-wing means for rotation about the spanwise axis.

12. The aircraft of claim 11, wherein:

the spanwise axis is along a lower surface of the wing.

13. The aircraft of claim 1, further comprising:

a mechanical stop for limiting passive rotation of the wing to an attitude suited for rapid forward flight.

14. An aircraft for generally vertical flight in takeoff, hover and landing, substantially horizontal cruising flight; and transitional flight between vertical and horizontal flight; said aircraft comprising:

a fuselage having a generally longitudinal axis;

support means for standing the aircraft for vertical takeoff and landing, with the fuselage axis substantially vertical, on a landing surface;

ducted-fan means, supported from the fuselage aft, for propelling the aircraft in vertical, horizontal and transitional flight; and at each side of the fuselage, a wing supported from the fuselage for rotation about a generally spanwise axis, substantially for providing lift in forward flight;

wherein the fuselage-axis attitude for transitional flight varies between substantially vertical in vertical flight, and generally horizontal in horizontal flight; and wherein during vertical and transitional flight the leading edge of the wing is down relative to the fuselage axis.

15. The aircraft of claim 14, wherein the wing is supported from the fuselage for rotation about said axis, between:

a leading-edge-down attitude with respect to the fuselage, in vertical and transitional flight; and a substantially conventional attitude with respect to the fuselage, in cruising forward flight.

16. The aircraft of claim 15, wherein:

the substantially conventional attitude is leading-edge-up with respect to an oncoming air stream.

17. The aircraft of claim 15, wherein:

in cruising forward flight, the wing is limited to the substantially conventional attitude by a positive mechanical stop.

18. The aircraft of claim 15, wherein:

the wing is supported for passive rotation relative to the fuselage, in vertical and transitional flight; and is limited to the substantially conventional attitude by a positive mechanical stop, in cruising forward night.

19. The aircraft of claim 15, further comprising:

actuators for controlling incidence of the wing in transitional flight.

20. The aircraft or claim 14, wherein:

the ducted-fan means comprise:

a fan, and a generally cylindrical duct surrounding the fan, and generally surrounding a segment of the fuselage; and the wing extends outboard beyond the duct.

21. The aircraft of claim 20, wherein:

the outboard extension of the wing beyond the duct is larger than the duct diameter.

22. An aircraft for generally vertical flight in takeoff, hover and landing: substantially horizontal crusing flight; and transitional flight between vertical and horizontal flight; said craft comprising:

a fuselage having a generally longitudinal axis;

support means for standing the aircraft for vertical takeoff and landing, with the fuselage axis substantially vertical, on a landing surface;

ducted-fan means, supported from the fuselage aft, for propelling the aircraft in vertical, horizontal and transitional flight, and at each side of the fuselage, a wing supported from the fuselage for rotation, relative to the fan means and relative to the fuselage, about a generally spanwise axis, the primary function of said wing being provision of lift in horizontal and transitional flight;

wherein the fuselage-axis attitude in transitional flight varies between substantially vertical in vertical flight, and generally horizontal in horizontal flight; and wherein the wing incidence in transitional flight is substantially always within a small range of angles of attack with respect to an oncoming airstream.

23. The aircraft of claim 22, further comprising:

means for maintaining the wing incidence, during transitional flight, within said small range of angles of attack with respect to the oncoming airstream.

24. The aircraft of claim 23, wherein:

the incidence-maintaining means comprise actuators scheduled by a flight-control system.

25. The aircraft of claim 22, wherein:

the ducted-fan means comprise:

a fan, and a generally cylindrical duct surrounding the fan, and generally surrounding a segment of the fuselage; and the wing extends outboard beyond the duct.

26. The aircraft of claim 25, wherein:

the outboard extension of the wing beyond the duct is larger than the duct diameter.

*27. An aircraft for hovering flight, generally vertical takeoff and landing, and substantially horizontal forward flight, comprising:*

*a fuselage having a generally longitudinal axis;*

*a support arrangement for standing the aircraft for vertical takeoff and landing, with the fuselage axis substantially vertical on a landing surface;*

*a propulsion system, supported from the fuselage, for propelling the aircraft in both (a) hovering and vertical flight and (b) substantially horizontal forward flight; and*

*at each side of the fuselage, a floating-wing, supported from the fuselage for passive rotation about a generally spanwise axis, for providing lift in forward flight;*

*wherein the fuselage-axis attitude varies between substantially vertical in hovering and vertical flight, and generally horizontal in forward flight.*

* * * * *